United States Patent
Tammi et al.

(10) Patent No.: US 7,583,963 B2
(45) Date of Patent: Sep. 1, 2009

(54) USER REGISTRATION IN A COMMUNICATION SYSTEM

(75) Inventors: Kalle Tammi, Nokia (FI); Minna Myllymäki, Tampere (FI); Jari Koivula, Tampere (FI); Sami N. Salonen, Tampere (FI)

(73) Assignee: Nokia Corporation, Espoo (FI)

( * ) Notice: Subject to any disclaimer, the term of this patent is extended or adjusted under 35 U.S.C. 154(b) by 938 days.

(21) Appl. No.: 11/006,608

(22) Filed: Dec. 8, 2004

(65) Prior Publication Data

US 2006/0030320 A1 Feb. 9, 2006

(30) Foreign Application Priority Data

Aug. 3, 2004 (GB) .................................. 0417296.1

(51) Int. Cl.
*H04W 4/00* (2009.01)
(52) U.S. Cl. .................. 455/435.1; 455/433; 455/456.5
(58) Field of Classification Search ................. 455/433, 455/435.1, 465.5
See application file for complete search history.

(56) References Cited

U.S. PATENT DOCUMENTS

| | | | |
|---|---|---|---|
| 6,993,038 B2 * | 1/2006 | McCann | 370/401 |
| 7,061,887 B2 * | 6/2006 | Fan | 370/331 |

FOREIGN PATENT DOCUMENTS

| | | |
|---|---|---|
| CN | 1304105 | 7/2001 |
| EP | 1130489 | 9/2001 |
| EP | 1365620 | 11/2003 |
| WO | WO 03/081937 | 10/2003 |
| WO | WO 03081545 | 10/2003 |
| WO | WO 2004/054302 | 6/2004 |

OTHER PUBLICATIONS

3GPP TS 29.229, Jun. 2004, ETSI, version 5.7.0 Release 5, Entire Document.*
3GPP TS 29.228, Jun. 2004, ETSI, version 5.8.0 Release 5, Entire Document.*

* cited by examiner

*Primary Examiner*—Nick Corsaro
*Assistant Examiner*—Vladimir Magloire
(74) *Attorney, Agent, or Firm*—Squire, Sanders & Dempsey L.L.P.

(57) ABSTRACT

A method of registering users in a mobile communications system, the method comprising the steps of: storing in a user information store primary and secondary identifiers identifying a first serving controller; receiving a request from a serving controller, said request identifying that serving controller using primary and secondary identifiers; comparing the primary identifier in the user information store with the primary identifier in said request and, if there is a mismatch, comparing the secondary identifier in the user information store with the secondary identifier in said request wherein, when there is a mismatch between the secondary identifiers it is determined that the serving controller identified in the request is not the first serving controller; and when there is a match between the secondary identifiers it is determined that the serving controller identified in the request is the first serving controller.

30 Claims, 3 Drawing Sheets

| USER ID | PUBLIC ID | REGISTRATION STATUS | LOCATION |
|---|---|---|---|
| UE1 | Pid 1 | Reg | $SIPURI_1, DCA_1$ |
| UE2 | Pid 2 | Reg | $SIPURI_1, DCA_1$ |
| UE3 | Pid 3 | Reg | $SIPURI_2, DCA_2$ |

38

FIG. 4
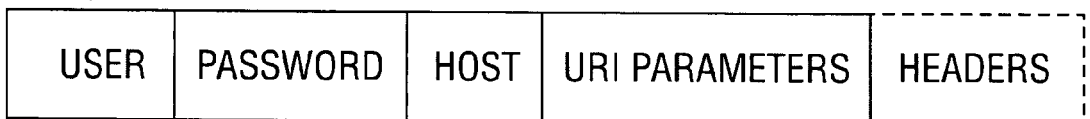
FIG. 5
FIG. 6
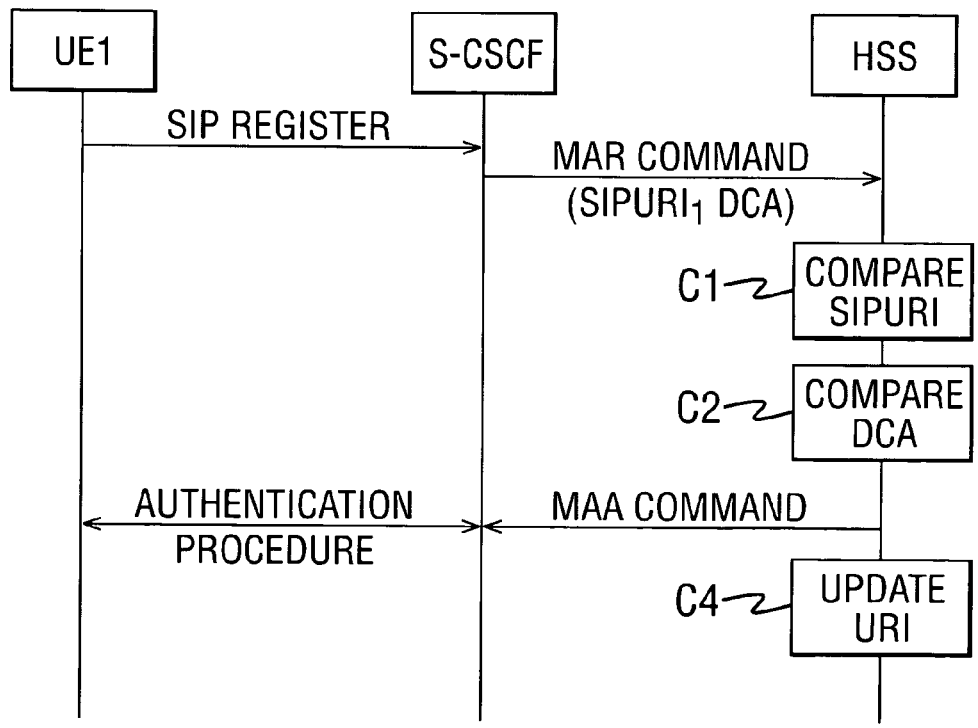

USER REGISTRATION IN A COMMUNICATION SYSTEM

The present invention relates to user registration in a communication system.

A diverse range of communication systems are in use today enabling communication between two or more entities, such as user equipment and/or other nodes associated with the system. Such systems may comprise, for example, communication of voice, data, and multimedia data.

Communication systems providing wireless communication for user terminals or other nodes are known. An example of a wireless system is a public land mobile network (PLMN). A PLMN is typically a cellular network wherein a base transceiver station (BTS) or similar access entity serves user equipment (UE) such as mobile stations (MS) via a wireless interface. The operation of the apparatus required for the communication is usually controlled by one or more control entities, which themselves may be interconnected. One or more gateway nodes provide for connecting the PLMN to other networks. Examples of other such networks are another cellular network, a public switched telephone network (PSTN) and packet switched data networks such as an IP (Internet Protocol) based network. The communication between the user equipment and the other elements of the communication system are based on an appropriate communications protocol, which defines the "rules" under which communication is handled in the system.

In the current third generation (3G) wireless system, there are defined various servers for the handling of different communication services for mobile users.

These include servers that provide call session control functions, known as CSCFs. Control functions may also be provided by entities such as a home subscriber server (HSS) and various application servers (AS). The HSS is typically for permanently storing the user's (subscriber's) profile. For example, in the Release 5 architecture for 3G, as specified by the $3^{rd}$ Generation Partnership Project (3GPP), these entities can be found located in the IP Multimedia Subsystem (IMS). Call session control function provides a serving function S-CSCF, an interrogating function, I-CSCF and a proxy function P-CSCF.

The IMS network may sit at the hub of the 3G architecture, supporting an IP based network that handles both traditional voice telephony and multimedia services. The 3GPP has chosen Session Initiation Protocol (SIP) as a core session signalling protocol for 3G networks. SIP has been developed by the Internet Engineering Task Force (IETF). The 3GPP specification 24.229 describing the IMS network basic operation from an SIP perspective can be found at www.3gpp.org/ftp/Specs/latest/Rel-5/24_series/. It should be noted that SIP is a request/response style protocol, in the sense that for every message sent from a source, there is an associated response from the destination confirming receipt of the sent message.

Users are registered with S-CSCFs according to location and available communication links. The interrogating serving call session control function (I-CSCF) is used to contact the S-CSCFs. When the S-CSCF which is the assigned S-CSCF for a user cannot be contacted by the I-CSCF, it is possible to assign a new S-CSCF for a user during the registration procedure. When this is done, it is possible that the home subscriber server HSS receives a multimedia authentication request (MAR) command including an S-CSCF name which is not the same as the previously assigned S-CSCF for the user. In the existing 3GPP protocol, the home subscriber server can deregister the registrations in the old S-CSCF by using the Registration-Termination-Request (RTR) command. By assigning the reason NEW_SERVER_ASSIGNED to this command, this causes the user's public identity which is registered in the new S-CSCF to be deregistered from the old S-CSCF. Reference is made to an earlier filed U.S. application Ser. No. 10/813,277 in the name of Nokia Corporation (Nokia Ref: NC40087) by way of background to optimising deregistration.

A particular S-CSCF is identified by a SIP URI (Session Initiation Protocol Uniform Resource Identifier). According to the IETF RFC 3261 (Request For Comments) a SIP URI takes the following general form:

Sip:user:password@host:port;uri-parameters?headers

The "user" field is the identifier of a particular resource at the host being addressed. In this form, the user information comprises the user field, the password field and the @ field. The "password" field is a password associated with the user, and the "host" field identifies the host providing the SIP resource. The "port" field is the port number where the request is to be sent. The uri-parameters affect a request constructed from the URI, for example allowing transport, maddr (server address), ttl (time-to-live), user, method and lr (routing) parameters to be set in a manner known per se.

"Headers" are header fields to be included in a request constructed from the URI.

According to the SIP URI comparison rules specified in the IETF RFC 3261, for two URIs to be equal the user, password, host and port components must match. Moreover, any uri parameter appearing in both URIs must match while rules govern the situation where a parameter is present in one URI and not the other. Header components are not ignored—any present header components must be present in both URIs and must match.

As a consequence of these rules, the inventors appreciate that a situation can arise where a mismatch between SIP URIs is indicated, even where the S-CSCF is in fact the same. This can trigger an unwanted deregistration procedure towards the S-CSCF.

It is an aim of the present invention to reduce unnecessary deregistration procedures.

According to one aspect of the present invention there is provided a method of registering users in a mobile communications system, the method comprising the steps of: storing in a user information store primary and secondary identifiers identifying a first serving controller; receiving a request from a serving controller, said request identifying that serving controller using primary and secondary identifiers; comparing the primary identifier in the user information store with the primary identifier in said request and, if there is a mismatch, comparing the secondary identifier in the user information store with the secondary identifier in said request wherein, when there is a mismatch between the secondary identifiers it is determined that the serving controller identified in the request is not the first serving controller; and when there is a match between the secondary identifiers it is determined that the serving controller identified in the request is the first serving controller.

Another aspect provides a communication system comprising: a first serving controller; a user information store which holds for a user at least one identity in association with the first serving controller, wherein the first serving controller is identified by primary and secondary identifiers; means for receiving a request from a serving controller, said request identifying that serving controller using primary and secondary identifiers; and means for comparing the primary identifier in the user information store with the primary identifier in said request and, if there is a mismatch, comparing the secondary identifier in the user information store with the secondary identifier in said request wherein, when there is a mismatch between the secondary identifiers it is determined that the serving controller identified in the request is not the first serving controller, and when there is a match between the secondary identifiers it is determined that the serving controller identified in the request is the first serving controller.

Another aspect provides a network entity for use in a mobile communications system for providing communication between users, the network entity comprising: a user information store which holds for a user at least one identity in association with a first serving controller, the first serving controller being identified by primary and secondary identifiers; means for receiving a request from a serving controller, said request identifying that serving controller using primary and secondary identifiers; and means for comparing the primary identifier in the user information store with the primary identifier in said request and, if there is a mismatch, comparing the secondary identifier in the user information store with the secondary identifier in said request wherein, when there is a mismatch between the secondary identifiers it is determined that the serving controller identified in the request is not the first serving controller, and when there is a match between the secondary identifiers it is determined that the serving controller identified in the request is the first serving controller.

In the 3GPP architecture, the user information store is constituted by the Home Subscriber Server (HSS), but it will be appreciated that in other architectures a different database may be provided. Also, the serving controllers are provided by the Serving Call Session Control Functions (S-CSCF) in a 3GPP architecture, but again it will be appreciated that in a different architecture any suitable controller could perform this role.

The request identifying the serving controller can be an MAR (Multimedia-Authentication-Request).

The deregistration request can be an RTR (Registration-Termination-Request) command according to the known 3G protocol, or can be the equivalent or other suitable command in different protocols.

For a better understanding of the present invention and to show how the same may be carried into effect, reference will now be made by way of example to the accompanying drawings in which:

FIG. 4 illustrates address components of an MAR command;

FIG. 5 illustrates fields of an SIP URI; and

FIG. 6 is a schematic diagram illustrating message flow where comparison is successful.

Certain embodiments of the present invention will be described in the following by way of example, with reference to the exemplifying architecture of a third generation (3G) mobile communications system. However, it shall be appreciated that the embodiments may be applied to any suitable communication system.

Figure 1:
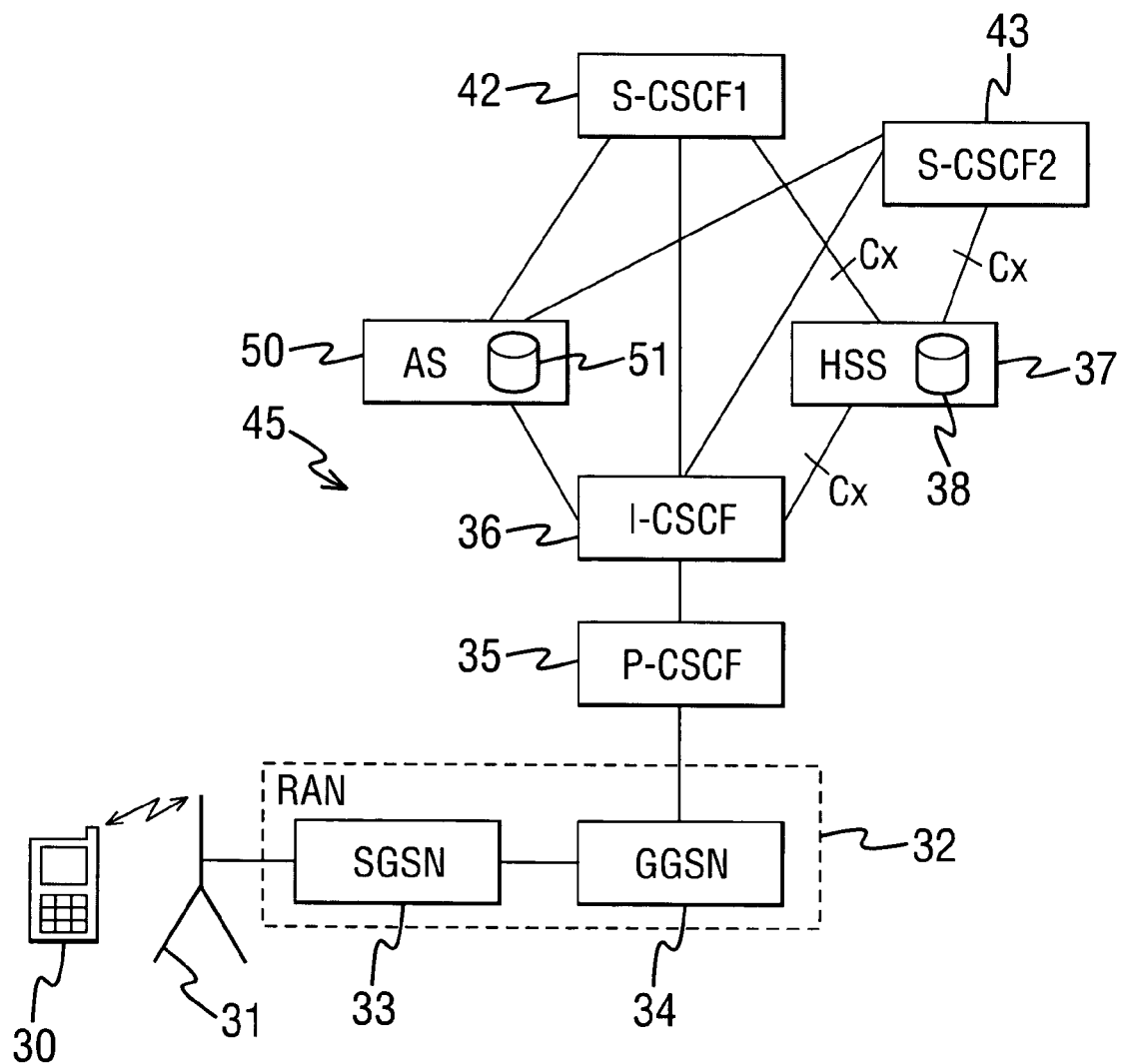
FIG. 1 is a schematic diagram showing the environment in which an embodiment of the invention can be implemented.

Reference is made to FIG. 1 which shows an example of a network architecture wherein the invention may be embodied. In FIG. 1 an IP Multimedia Subsystem (IMS) 45 is provided for offering IP multimedia services for IP Multimedia Network subscribers.

As described above, IP Multimedia (IM) functionalities can be provided by means of a mobile communication system. A mobile communication system is typically arranged to serve a plurality of mobile user equipment (UE) usually via a wireless interface between the user equipment and at least one base station of the communication system. The mobile communication system may logically be divided between a radio access network (RAN) and a core network (CN).

In the system a base station 31 is arranged to transmit signals to and receive signals from mobile user equipment 30 of a mobile user i.e. subscriber via a wireless interface between the user equipment and the radio access network. Correspondingly, the mobile user equipment is able to transmit signals to and receive signals from the radio access network via the wireless interface.

In the shown arrangement the user equipment 30 may access the IMS network 45 via the access network associated with base station 31, respectively. It shall be appreciated that, although, for clarity reasons FIG. 1 shows a base station of only one radio access network, a typical communication network system usually includes a number of radio access networks.

The 3G radio access network (RAN) is typically controlled by an appropriate radio network controller (RNC). This controller is not shown in order to enhance clarity. A controller may be assigned for each base station or a controller can control a plurality of base stations, for example in the radio access network level. It shall thus be appreciated that the name, location and number of the network controllers depends on the system.

The mobile user equipment 30 may comprise any appropriate mobile user equipment adapted for Internet Protocol (IP) communication to connect the network. For example, the mobile user may access the cellular network by means of a Personal computer (PC), Personal Data Assistant (PDA), mobile station (MS) and so on. The following examples are described in the context of mobile stations.

One skilled in the art is familiar with the features and operation of a typical mobile station. Thus, it is sufficient to note that the user may use a mobile station for tasks such as for making and receiving phone calls, for receiving and sending data from and to the network and for experiencing multimedia content or otherwise using multimedia services. A mobile station may include an antenna for wirelessly receiving and transmitting signals from and to base stations of the mobile communication network. A mobile station may also be provided with a display for displaying images and other graphical information for the user of the mobile user equipment. Camera means may be provided for capturing still or video images. Speaker means are also typically provided. The operation of a mobile station may be controlled by means of an appropriate user interface such as control buttons, voice commands and so on. Furthermore, a mobile station is provided with a processor entity and a memory means.

It shall be appreciated that although only one mobile station is shown in FIG. 1 for clarity, a number of mobile stations may be in simultaneous communication with base stations of a mobile communication system.

The core network (CN) entities typically include various switching and other control entities and gateways for enabling the communication via a number of radio access networks and also for interfacing a single communication system with one or more communication system such as with other cellular systems and/or fixed line communication systems. In the 3GPP systems the radio access network controller is typically connected to an appropriate core network entity or entities such as, but not limited to, a serving general packet radio service support node (SGSN) 33. The radio access network controller is in communication with the serving GPRS support node via an appropriate interface, for example on an Iu interface. Although not shown, the SGSN typically has access to designated subscriber database configured for storing information associated with the subscription of the respective user equipment.

The serving GPRS support node, in turn, typically communicates with a gateway GPRS support node (GGSN) 34 via the GPRS backbone network 32. This interface is commonly a switched packet data interface.

FIG. 1 shows an application server (AS) 50. The user equipment 30 may connect, via the GPRS network, to the application server that is connected to one or more data networks such as, but not limited to, the exemplifying Internet Protocol (IP) network. It shall be appreciated that a great number of application servers may be connected to each data network.

The communication systems have developed in the direction wherein services are provided for the user equipment by means of various functions of the data network that are handled by controller entities, such as servers. For example, in the current third generation (3G) wireless multimedia network architectures it is assumed that several different servers providing various control functions are used for the service provision control. These include functions such as the call session control functions (CSCFs). The call session functions may be divided into various categories such as a proxy call session control function (P-CSCF), interrogating call session control function (I-CSCF), and serving call session control function (S-CSCF). It shall be appreciated that similar functions may be referred to in different systems with different names. For example, in certain applications the CSCFs may be referenced to as the call state control functions.

A user who wishes to use services provided by an application server via the IMS system may need first to register with a serving controller, such as the serving call session control function (S-CSCF1) 42. As shown in FIG. 1, communication between the S-CSCF 42 and the user equipment 30 may be routed via at least one proxy call session control function (P-CSCF) 35 and an interrogating call session control function I-CSCF 36. The proxy CSCF 35 is thus for proxying messages from the GGSN 34 to a serving call session control function 42. The S-CSCF 42 in FIG. 1, in turn, provides the control entity the user equipment 30 needs to be registered with. The registration is required to enable the user equipment to request a service from the communication system.

The system of FIG. 1 is further arranged such that a user who has been provided with required communication resources by the backbone network and is registered to the S-CSCF 42 has to initiate the use of services offered by the application server 50 by sending a request for the desired service to the S-CSCF 42 over the communication system.

In FIG. 1, another serving call session control function 43, S-CSCF2, is illustrated. In practice there will of course be a number of S-CSCFs.

A user information storage entity may also be provided for storing subscriber i.e. user related information. In the particular embodiment the storage entity is shown to be provided by means of a home subscriber server (HSS) 37. The home subscriber server (HSS) 37 can be queried by other function entities over the appropriate interfaces, e.g. during session set-up procedures and later. The subscriber information may include information such as data required for registration and authentication purposes (e.g. identities and registration status of the subscriber) and so on. The HSS 37 can also be used for storing permanently subscriber profile information. In particular, the home subscriber server holds information associating public identities with particular user equipment UE, and identifying the S-CSCF to which that UE is registered. Each UE is identified with unique private identity, which has the form of Network Access Identifier, for example UE1@example.org. Each S-CSCF is identified by a SIP URI (Session Initiation Protocol Uniform Resource Identifier), for example sip:s-cscf1.example.org:5060. Each S-CSCF is also identified by its Diameter identity, which is presented in the format of Fully Qualified Domain Name (FQDN), for example s-cscf1.example.org. The Diameter based protocol is intended to provide an authentication, authorisation and accounting (AAA) framework for applications such as network access or IP (Internet Protocol) mobility. The basic Diameter transaction involves attribute value pairs (AVPs), that is paired attributes (e.g. user ID, password) and values for those attributes (e.g. John Doe, Marigold) which can be used for authentication purposes. These AVPs constitute information elements in a Diameter message. Thus, when a message is dispatched from an S-CSCF according to the Diameter protocol, it includes an Origin-Host AVP which identifies the source of the Diameter message (the Diameter Client Address—DCA).

Figures 2, 3:
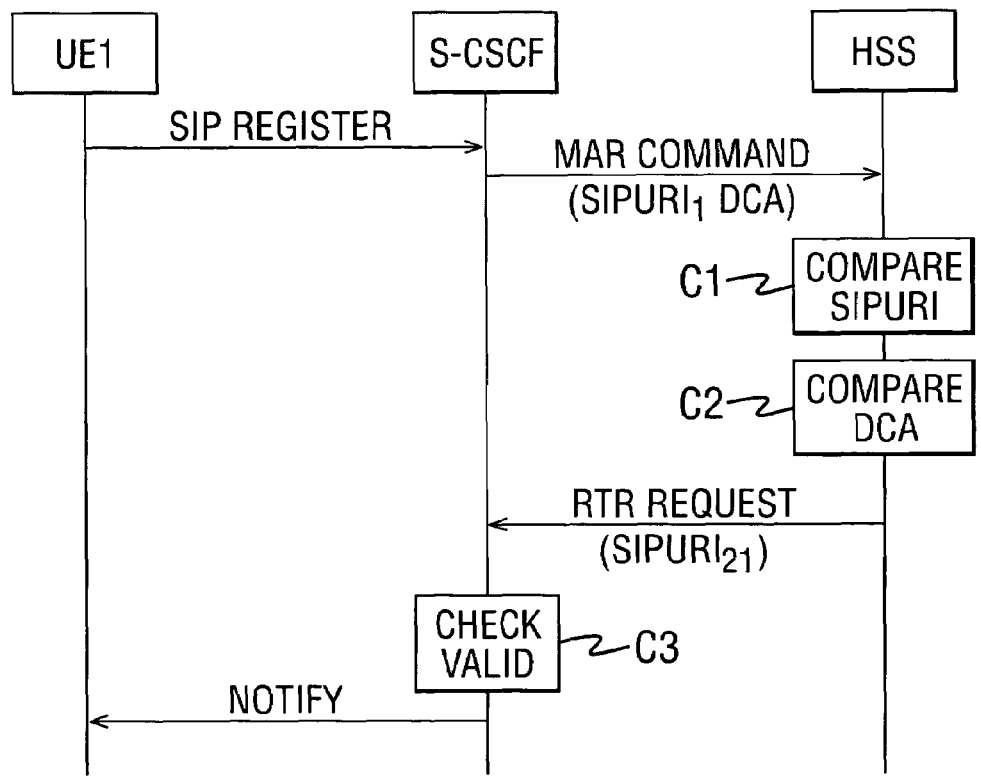
FIG. 2 is a schematic diagram illustrating the storage of S-CSCF assignments.
FIG. 3 is a schematic diagram illustrating message flow where comparison is unsuccessful.

FIG. 2 shows by way of example the contents of the home subscriber server database 38. It will be appreciated that this is by way of example only and the precise layout and protocol will vary in accordance with the network requirements. Each user equipment UE is shown associated with only one public identity Pid, though in practice there may be several for each UE. The public identity is user's public address, which is used for communications within the IMS system. The public user identity can, for example, be in a form of SIP URI like sip: pid1@example.org. The database 38 also indicates a registration status for each user equipment UE1, UE2, UE3 etc and the current registered location for that user equipment. The current registered location represents the S-CSCF with which the user equipment is currently registered, identified by an SIP URI and a DCA in each case. In the example of FIG. 2, the user equipments UE1, UE2 are shown registered to S-CSCF 1 while the user equipment UE3 is shown registered to S-CSCF 2. If there is a change in the assignment of a particular user equipment to a particular S-CSCF, it is necessary for the HSS database 38 to be appropriately updated. It is also necessary to implement a deregistration procedure towards the previous S-CSCF and user equipment itself to make sure that the user equipment is aware that it is no longer registered with a particular S-CSCF so that a new registration procedure can be accomplished to a new S-CSCF. The procedure for this will now be discussed with reference to FIGS. 3 to 6.

In a 3G network, when a user first switches on his mobile terminal, he must register his user ID or address with the network before allowing the terminal to fully connect. This is done by sending an SIP 'REGISTER' message, which includes details of the user's address, from the terminal to the IMS. This information is processed at the serving call session control function (S-CSCF) which stores the relevant registration information at the HSS. This registration information may include the status of the user such as the location, terminal capability and user availability. The registration is acknowledged by the IMS through a suitable response message that is also in accordance with SIP. Subsequent registrations also take place ('re-REGISTER') whenever the preceding registration has expired, or when there is a change in the status of the user or another reason to refresh the registration.

In FIG. 3 it is assumed that a registration procedure has previously been conducted to register UE1 at S-CSCF1. Now, a re-REGISTER request is issued labelled SIP REGISTER in FIG. 3. In order to request authentication information and to check that the user equipment UE1 is registered in respect of S-CSCF1, the S-CSCF1 issues a Multimedia-Authentication-Request (MAR) command which identifies itself using its SIP URI$_1$ (a primary identifier). Also, because the MAR command is constructed according to the Diameter protocol, the diameter client address DCA (secondary identifier) is included in the MAR command in the form of an Origin-Host AVP identifying S-CSCF 1, as shown in FIG. 4. The home subscriber server 37 receives the MAR command and seeks to establish whether there has been a change in assigned S-CSCF for the particular user equipment. The first step is to compare the SIP URI received in the MAR command with the SIP URI which is stored at the HSS database 38. The construction of the SIP URI is shown in FIG. 5 and, as has already been discussed above, comprises a plurality of different fields: user, password, host, URI, parameters, headers. Applying the match criteria set down in IETF RFC 3261 can lead to a mismatch between the SIP URI in the MAR command and the SIP URI held at the HSS database 38 even when in fact the user, password and host fields (identifying the S-CSCF) match. That is, the Comparison Rules which are utilised can lead to the result that the home subscriber server 37 considers that there has been a change in the S-CSCF when in fact there has not been a change in the assigned S-CSCF. The compare function of the subscriber server 37 is denoted C1 in FIG. 3, and it will be appreciated that this can be carried out in any suitable software or hardware. If the compare function indicates that there is a difference between the SIP URI received in the MAR command and the SIP URI held at the database 38, the home subscriber server proceeds to a second compare function C2 which compares the Diameter client address received in the MAR command with the Diameter client address held at the database 38. If the Diameter client address received in the MAR command does not match the one which is held at the database 38, it can safely be assumed that the S-CSCF has been changed and in that case the home subscriber server 37 dispatches a deregistration request (RTR—Registration Termination Request) to the S-CSCF. Optionally, and shown in FIG. 3, the home subscriber server 37 can add the SIP URI 2 of a newly assigned S-CSCF to the RTR request so that the S-CSCF can detect whether the RTR request is valid or not. The S-CSCF checks if the SIP URI received in the RTR has identical host part with the SIP URI of the S-CSCF itself. The check valid function is denoted C3 in FIG. 3.

The home subscriber server 37 inserts into the RTR command the deregistration reason NEW_SERVER_ASSIGNED together with the SIP URI of the new S-CSCF2, the private identity of the UE1 and the public identities, which have been registered to the new S-CSCF2. When the first S-CSCF1 receives the RTR command with the deregistration reason assigned to the value NEW_SERVER_ASSIGNED it removes the user data of those public identities from the local database of the S-CSCF. If the S-CSCF1 stores also other public identities of the UE1, but which are not yet registered in the new S-CSCF2, the home subscriber server 37 sends another RTR command to the S-CSCF1. Then HSS inserts into the RTR command the deregistration reason SERVER_CHANGE together with the SIP URI of the new S-CSCF2, the private identity of the UE1 and the public identities which haven't been registered yet to the new S-CSCF2. When the first S-CSCF1 receives the RTR command with the deregistration reason assigned to the value SERVER_CHANGE it removes the user data of those public identities from the local database of the S-CSCF and it may issue a NOTIFY message to the user equipment UE1. The NOTIFY message contains an indication for the user equipment UE1 to re-register at the new S-CSCF2. It achieves this by performing a re-registration procedure as indicated in FIG. 3, and as described above.

FIG. 6 shows the situation where the compare DCA function C2 leads to the result that the DCA in the MAR command matches the DCA held at the database 38. In that case, the home subscriber server 37 assumes that the S-CSCF SIP URI is to be updated in its database 38 but that the actual S-CSCF has remained the same. In that case, no RTR is sent but instead the authentication procedure continues by way of an MAA (Multimedia-Authentication-Answer) command in a manner which is known per se. The update URI function is denoted C4 in FIG. 6.

The above-described embodiment of the invention thus optimises an existing functionality of 3GPP IMS deregistration. In particular it optimises the Cx interface usage and the behaviour of the HSS to reduce unnecessary deregistration procedures for assigned S-CSCFs. It will readily be appreciated that the IMS network illustrated in FIG. 1 may comprise further S-CSCFs, interrogating CSCFs and proxy CSCFs. Likewise, although embodiments of the present invention have been described in the context of 3G using SIP, other suitable systems and interface protocols could be used. In particular, although the above-described embodiment utilises the Diameter protocol and consequently the Diameter client address DCA for the second comparison, it will be appreciated that any protocol could be utilised and in particular any secondary identifier for the S-CSCF.

It is also noted herein that while the above-described exemplifying embodiments of the invention, there are several variations and modifications which may be made to the disclosed solution without departing from the scope of the present invention as defined in the appended claims.

The invention claimed is:

1. A method, comprising:
   receiving a request from a first serving controller, said request identifying the first serving controller using primary and secondary identifiers; and
   comparing a primary identifier of a second serving controller in a user information store with the primary identifier in said request and, if there is a mismatch, comparing a secondary identifier of the second serving controller in the user information store with the secondary identifier in said request,
   wherein, when there is a mismatch between the secondary identifiers, a determination is made that the first serving controller identified in the request is not the second serving controller, and
   wherein, when there is a match between the secondary identifiers, a determination is made that the first serving controller identified in the request is the second serving controller.

2. A method according to claim 1, further comprising, when there is a mismatch in the secondary identifiers, issuing a deregistration request to the second serving controller.

3. A method according to claim 1, further comprising, where there is a match between the secondary identifiers, implementing an authentication procedure to authenticate a user terminal.

4. A method according to claim 1, further comprising providing said primary identifier as a session initiation protocol uniform resource identifier.

5. A method according to claim 1, further comprising providing said secondary identifier as a Diameter identity.

6. A method according to claim 1, further comprising providing said primary identifier with a plurality of fields, wherein a first set of said plurality of fields identify the second serving controller and a second set of said plurality of fields hold additional parameters.

7. A method according to claim 6, wherein the comparing the primary identifiers causes a mismatch to be generated when the first set of the plurality of fields match but the second set of the plurality of fields does not match, thereby incorrectly indicating that the first serving controller identified in said request is not the second serving controller.

8. A method according to claim 1, further comprising, when there is a match between the secondary identifiers, updating the primary identifiers stored in the user information store with the primary identifier received in said request.

9. A method according to claim 2, further comprising including in the deregistration request a primary identifier of a newly assigned serving controller.

10. A system, comprising:
a first serving controller;
a receiver configured to receive a request from a second serving controller, said request identifying the second serving controller using primary and secondary identifiers; and
a processor configured to compare a primary identifier of the first serving controller in a user information store with the primary identifier in said request and, if there is a mismatch, compare a secondary identifier of the first serving controller in the user information store with the secondary identifier in said request,
wherein, when there is a mismatch between the secondary identifiers, a determination is made that the second serving controller identified in the request is not the first serving controller, and
wherein, when there is a match between the secondary identifiers, a determination is made that the second serving controller identified in the request is the first serving controller.

11. An apparatus comprising:
a receiver configured to receive a request from a first serving controller, said request identifying the first serving controller using primary and secondary identifiers; and
a processor configured to compare a primary identifier of a second serving controller in a user information store with the primary identifier in said request and, if there is a mismatch, compare a secondary identifier of the second serving controller in the user information store with the secondary identifier in said request,
wherein, when there is a mismatch between the secondary identifiers, a determination is made that the first serving controller identified in the request is not the second serving controller, and
wherein, when there is a match between the secondary identifiers, a determination is made that the first serving controller identified in the request is the second serving controller.

12. The apparatus according to claim 11, further comprising a home subscriber server.

13. The apparatus according to claim 11, further comprising a controller configured to dispatch a deregistration command when it is determined that the first serving controller identified in said request is not the second serving controller.

14. The apparatus according to claim 11, further comprising a controller configured to implement an authentication procedure towards a user terminal when it is determined that the first serving controller identified in said request is the second serving controller.

15. The apparatus according to claim 11, wherein the primary identifier comprises a session initiation protocol universal resource identifier.

16. The apparatus according to claim 11, wherein the secondary identifier comprises a Diameter identity.

17. The apparatus according to claim 13, wherein the controller is configured to insert into the deregistration command a primary identity of a newly assigned serving controller.

18. The apparatus according to claim 11, wherein the first serving controller comprises a call session control function.

19. An apparatus comprising:
receiving means for receiving a request from a first serving controller, said request identifying the first serving controller using primary and secondary identifiers; and
comparing means for comparing a primary identifier of a second serving controller in a user information store with the primary identifier in said request and, if there is a mismatch, comparing a secondary identifier of the second serving controller in the user information store with the secondary identifier in said request,
wherein, when there is a mismatch between the secondary identifiers, a determination is made that the first serving controller identified in the request is not the second serving controller, and
wherein, when there is a match between the secondary identifiers, a determination is made that the first serving controller identified in the request is the second serving controller.

20. A computer-readable storage medium encoded with instructions that, when executed on a computer, perform a process, the process comprising:
receiving a request from a first serving controller, said request identifying the first serving controller using primary and secondary identifiers; and
comparing a primary identifier of a second serving controller in a user information store with the primary identifier in said request and, if there is a mismatch, comparing a secondary identifier of the second serving controller in the user information store with the secondary identifier in said request,
wherein, when there is a mismatch between the secondary identifiers, a determination is made that the first serving controller identified in the request is not the second serving controller, and
wherein, when there is a match between the secondary identifiers, a determination is made that the first serving controller identified in the request is the second serving controller.

21. The computer-readable storage medium according to claim 20, further comprising, when there is a mismatch in the secondary identifiers, issuing a deregistration request to the second serving controller.

22. The computer-readable storage medium according to claim 20, further comprising, where there is a match between the secondary identifiers, implementing an authentication procedure to authenticate a user terminal.

23. The computer-readable storage medium according to claim 20, further comprising providing said primary identifier as a session initiation protocol uniform resource identifier.

24. The computer-readable storage medium according to claim 20, further comprising providing said secondary identifier as a Diameter identity.

25. The computer-readable storage medium according to claim 20, further comprising providing said primary identifier with a plurality of fields, wherein a first set of said plurality of fields identify the second serving controller and a second set of said plurality of fields hold additional parameters.

26. The computer-readable storage medium according to claim 25, wherein the comparing the primary identifiers causes a mismatch to be generated when the first set of the plurality of fields match but the second set of the plurality of fields does not match, thereby incorrectly indicating that the first serving controller identified in said request is not the second serving controller.

27. The computer-readable storage medium according to claim 20, further comprising, when there is a match between the secondary identifiers, updating the primary identifiers stored in the user information store with the primary identifier received in said request.

28. The computer-readable storage medium according to claim 21, further comprising including in the deregistration request a primary identifier of a newly assigned serving controller.

29. A method, comprising:
  receiving a request from a first serving controller, said request identifying the first serving controller using primary session initiation protocol uniform resource identifier and a secondary Diameter identifiers; and
  comparing a primary session initiation protocol uniform resource identifier of a second serving controller in a user information store with the primary session initiation protocol uniform resource identifier in the request and, if there is a mismatch, comparing a secondary diameter identifier of the second serving controller in the user information store with the secondary diameter identifier in said request,
  wherein, when there is a mismatch between secondary diameter identifiers a determination is made that the first serving controller is not the second serving controller, and a deregistration request is issued to the second serving controller, and
  wherein, when there is a match between the secondary diameter identifiers, a determination that the first serving controller is the second serving controller.

30. A network entity home subscriber server, comprising:
  a receiver configured to receive a request from a first serving controller, said request identifying the first serving controller using primary session initiation protocol uniform resource identifier and secondary diameter secondary identifiers; and
  a processor configured to compare a primary session initiation protocol uniform resource identifier of a second serving controller in a user information store with the primary session initiation protocol uniform resource identifier in said request and, if there is a mismatch, compare a secondary diameter identifier of the second serving controller in the user information store with the secondary diameter identifier in said request wherein,
  when there is a mismatch between the diameter identifiers a determination is made that the first serving controller identified in the request is not the second serving controller and a deregistration command is dispatched, and
  when there is a match between the diameter identifiers a determination is made that the first serving controller identified in the request is the second serving controller.

* * * * *

UNITED STATES PATENT AND TRADEMARK OFFICE
CERTIFICATE OF CORRECTION

PATENT NO. : 7,583,963 B2 Page 1 of 1
APPLICATION NO. : 11/006608
DATED : September 1, 2009
INVENTOR(S) : Tammi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1272 days.

Signed and Sealed this

Fourteenth Day of December, 2010

David J. Kappos
*Director of the United States Patent and Trademark Office*